United States Patent
Stansbie

Patent Number: 5,950,381
Date of Patent: Sep. 14, 1999

[54] DEVICE FOR PASSING A LENGTHY OBJECT THROUGH AN OPENING IN A WALL

[75] Inventor: Michael Stansbie, Wedemark, Germany

[73] Assignee: Alcatel, France

[21] Appl. No.: 08/840,889

[22] Filed: Apr. 17, 1997

[30] Foreign Application Priority Data

May 25, 1996 [DE] Germany ................ 296 09 416 U

[51] Int. Cl.[6] .................................................. E04C 2/52
[52] U.S. Cl. .................... 52/220.8; 16/2.2; 174/65 G; 277/603; 277/606; 277/616; 277/644; 285/192
[58] Field of Search ............... 16/2.1, 2.2; 52/27, 52/220.1, 220.8; 174/65 G, 151, 152 G, 153 G, 135; 248/56; 277/603, 606, 616, 627, 637, 644; 285/192, 194, 195, 207, 217, 218

[56] References Cited

U.S. PATENT DOCUMENTS

| | | | |
|---|---|---|---|
| 1,243,748 | 10/1917 | McMurtrie | 285/194 X |
| 2,311,427 | 2/1943 | Winkelmeyer | 174/65 G X |
| 2,897,533 | 8/1959 | Bull et al. | 16/2.1 |
| 4,033,535 | 7/1977 | Moran | 174/153 G |
| 4,640,479 | 2/1987 | Shely et al. | 174/153 G X |
| 4,758,688 | 7/1988 | Aschberger | 174/153 G |
| 5,190,408 | 3/1993 | Ozeki et al. | 285/208 X |
| 5,531,459 | 7/1996 | Fukuda et al. | 174/153 G X |
| 5,575,487 | 11/1996 | Balsells | 277/644 |
| 5,701,634 | 12/1997 | Uemura et al. | 174/152 G X |
| 5,736,677 | 4/1998 | Sato et al. | 174/65 G |
| 5,739,475 | 4/1998 | Fujisawa et al. | 174/153 G |

FOREIGN PATENT DOCUMENTS 0237758  9/1987  European Pat. Off. .

OTHER PUBLICATIONS

Montageanweisung Installation Instructions HTT 54.003–02 from the RFS Hannover Company, issue Aug. 1995.

Primary Examiner—Carl D. Friedman
Assistant Examiner—Kevin D. Wilkens
Attorney, Agent, or Firm—Ware, Fressola, Van der Sluys & Adolphson LLP

[57] ABSTRACT

A device is positioned for passing a lengthy object through an opening in a wall to which a flat plate made of a stable material is attached. The plate has a hole that corresponds to and is aligned with the opening. A one-piece rubber sleeve that surrounds the lengthy object is provided for its moisture-proof insertion, and has a lengthwise separation which can be closed. A circumferential groove is provided on the inside of the rubber sleeve and is designed to lay against the lengthy object; this groove contains a ring-shaped insert made of a flexible material. In addition, the rubber sleeve has an outwardly open circumferential recess at one outer axial end, to seal the edge that limits the hole in the plate.

16 Claims, 4 Drawing Sheets

DEVICE FOR PASSING A LENGTHY OBJECT THROUGH AN OPENING IN A WALL

BACKGROUND OF THE INVENTION

1. Technical Field

The invention concerns a device for passing a lengthy object through an opening in a wall, where a flat plate made of a stable material is attached to the wall and has a hole that corresponds to and is aligned with the opening, and a device for sealing the lengthy object is provided, which in the installed position is connected to the plate. (Installation instruction HTT 54.003-02 from the RFS Hannover Company, issue August 1995).

A "lengthy object" in the sense of the invention could be tubes and electrical cables, particularly high-frequency cables. The abbreviated expression "cable" is used in the following for all possible objects. Cables as a rule have a protective outer jacket made of plastic. Their core is therefore protected against moisture as long as the protective jacket is not damaged. The requirement of an effective protection against moisture also exists for the cable inlet area through a wall, when the cable is introduced into a building. After the cable has been installed, the opening in the wall must be sealed tightly enough so that no moisture can enter the building.

2. Description of the Prior Art

The above-cited installation instruction mentions a device which is available on the market and is designed as a "wall insert" for passing a cable through a wall. It includes a butyl sealant tape to be placed around the cable, a lengthwise open tube joint with a flange which is to be placed over the tape, as well as a clamp shell. After the flange has been bolted to a mechanically stable plate mounted on the wall of a building, the clamp shell is placed around the tube joint and is tightened by means of screws. This device proved itself in practice; however it is relatively expensive to install.

SUMMARY OF THE INVENTION

An object of the present invention is to simplify the device described above in regard to its construction and handling. This object is fulfilled by the invention in that the device used as a seal is a one-piece rubber sleeve with a lengthwise separation which can be closed, in that a circumferential groove is provided on the inside surface of the rubber sleeve designed to rest against the cable, the groove having a ring-shaped insert made of a flexible material, and in that the rubber sleeve has an outwardly open circumferential recess at one axial end, to seal the edge that defines the hole in the plate.

The rubber sleeve is made of one piece. Therefore, to introduce a cable into a building essentially only one part needs to be installed to seal the cable inlet area when the ring-shaped insert has been placed in the rubber sleeve during the preinstallation. This simplifies to a significant degree the construction of the device designed to seal the inlet area. After it has been laid around the cable, only one end needs to be pressed into the opening in the plate until its edge surrounds the recess. The rubber sleeve is then closed, for example with screws. It has a moisture-proof link with the plate and the insert seals the cable making it moisture-proof.

The invention will be fully understood when reference is made to the following detailed description taken in conjunction with the accompanying drawings.

BRIEF DESCRIPTION OF THE DRAWINGS

A configuration example of the subject of the invention is illustrated in the drawings where.

DETAILED DESCRIPTION OF THE INVENTION

Figure 1:
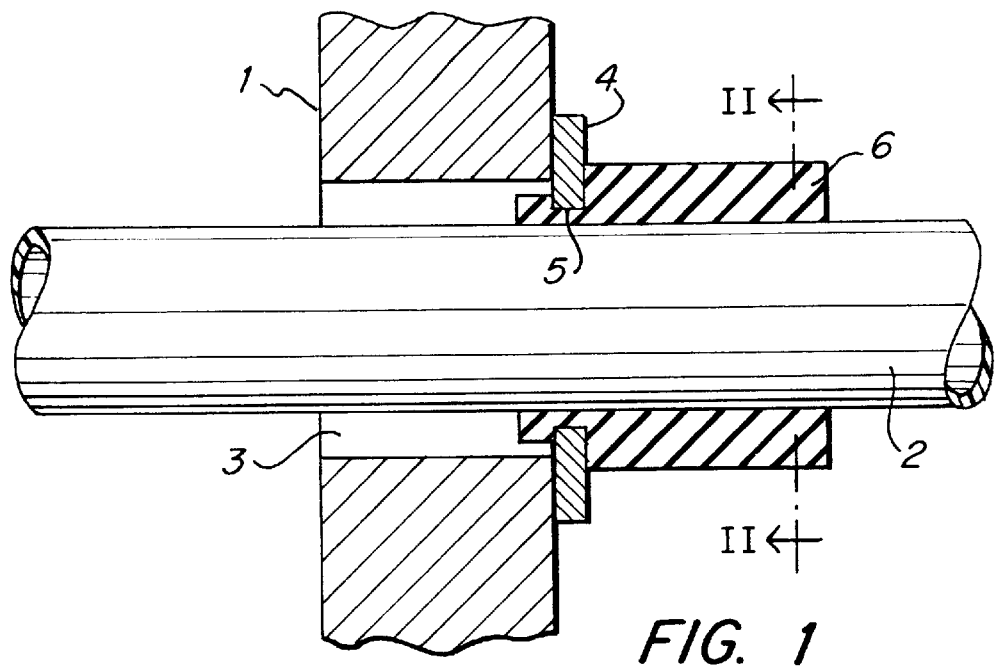
FIG. 1 is a schematic cross-sectional view of a wall passage with a device according to the invention.
Figure 2:
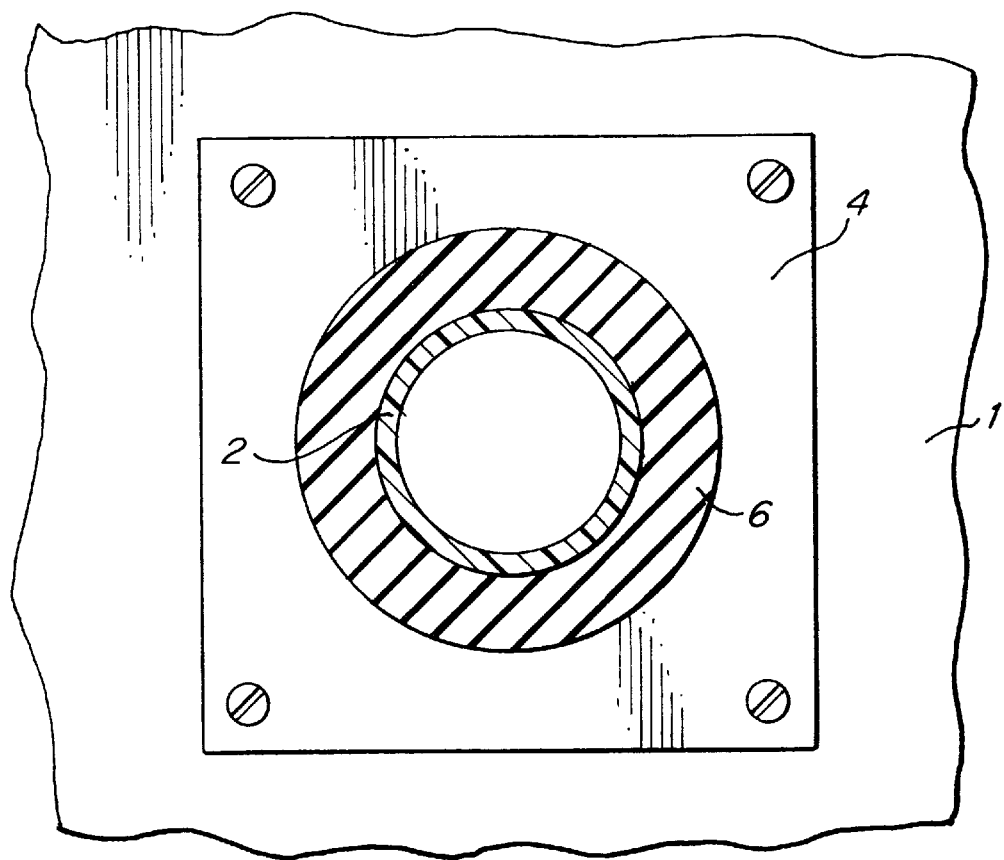
FIG. 2 is a cross-sectional view through FIG. 1 along line II—II.
Figure 3:
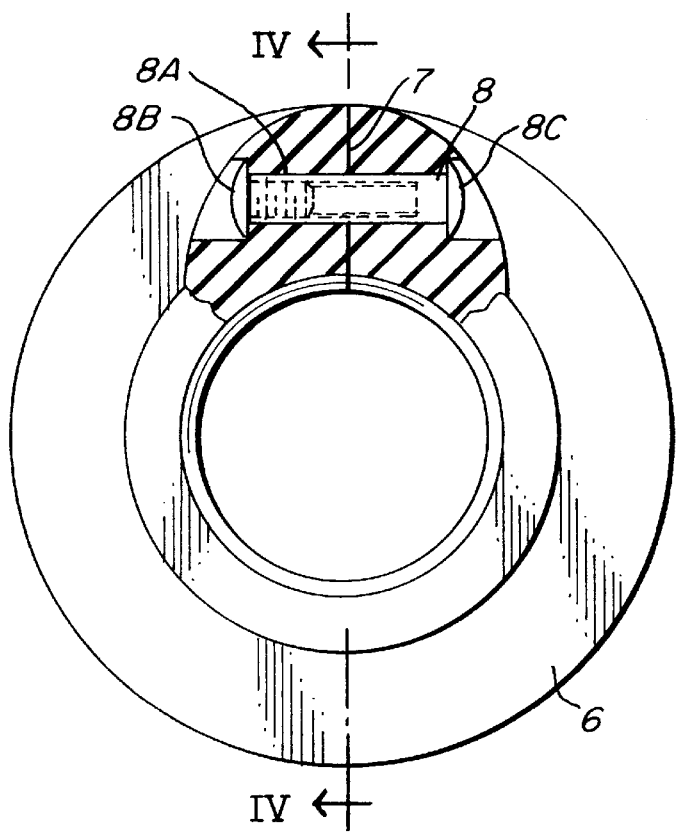
FIG. 3 is a front view of a rubber sleeve which can be used with the device with a portion broken away to illustrate internal structure.
Figure 4:
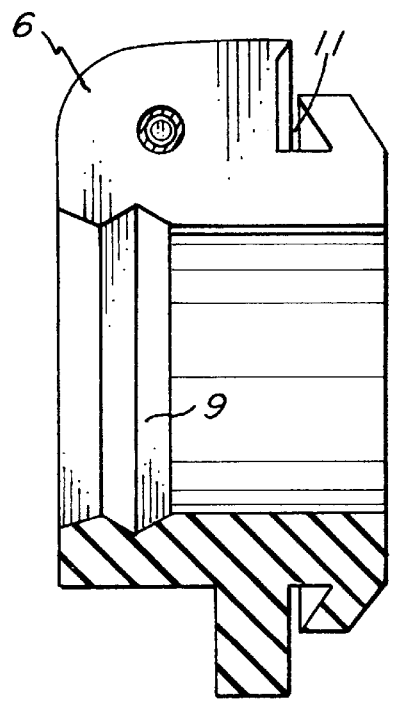
FIG. 4 is a cross-sectional view through FIG. 3 along line IV—IV.

Turning to FIG. 1, therein illustrated is a wall 1 of a building having an opening 3 through which a cable 2 extends. At the opening 3, a mechanically stable plate 4 made of steel is mounted on the outside of the wall 1 and contains a hole 5 which is aligned with the opening 3. In the inlet area, the cable 2 is surrounded by a rubber sleeve 6 which on the one hand lies in moisture-proof fashion against the cable 2, and against the plate 4 on the other hand. A more precise construction of the rubber sleeve 6 and its insertion into the wall 1 in the cable 2 inlet area can be found in FIGS. 3 to 7.

Figure 8:
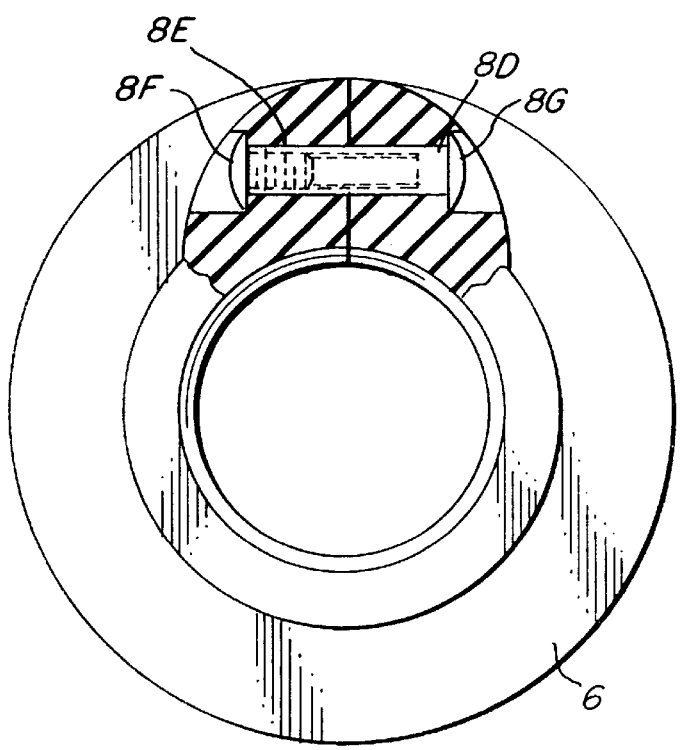
FIG. 8 is a front view of a rubber sleeve which can be used with the device of FIG. 1 with a portion broken away to illustrate internal structure.

The rubber sleeve 6 is made of one piece. It has a lengthwise separation 7 (FIG. 3) so that it can be placed around the cable 2. The separation 7 is also used to close the rubber sleeve 6. It is widened accordingly so that at least one screw joint 8 can be located therein. The screw joint 8 has a threaded tube-like body 8A with a head 8B for receiving a threaded screw 8C. The rubber sleeve 6 can then be closed by means of the screw joint 8. However, it can also be closed in a different manner, for example, by means of a snap joint 8D (FIG. 8). The snap joint 8D has a tube-like body 8E with a head 8F and a headed pin 8G. Tube-like body 8E and the pin 8G have securing elements (not shown) on their surfaces to secure the parts together.

Figure 5:
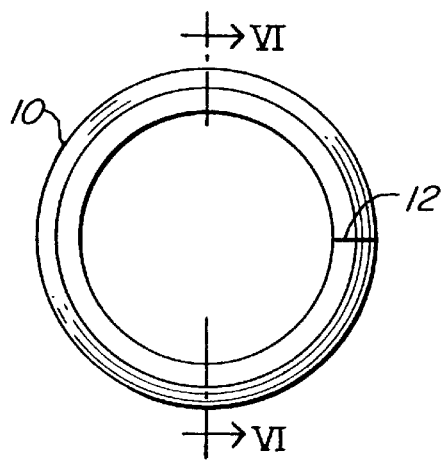
FIG. 5 is a front view of an insert which can be placed into the rubber sleeve.
Figure 6:
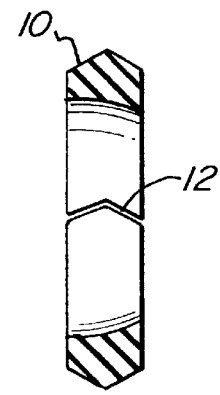
FIG. 6 is a cross-sectional view through FIG. 5 along line VI—VI.
Figure 7:
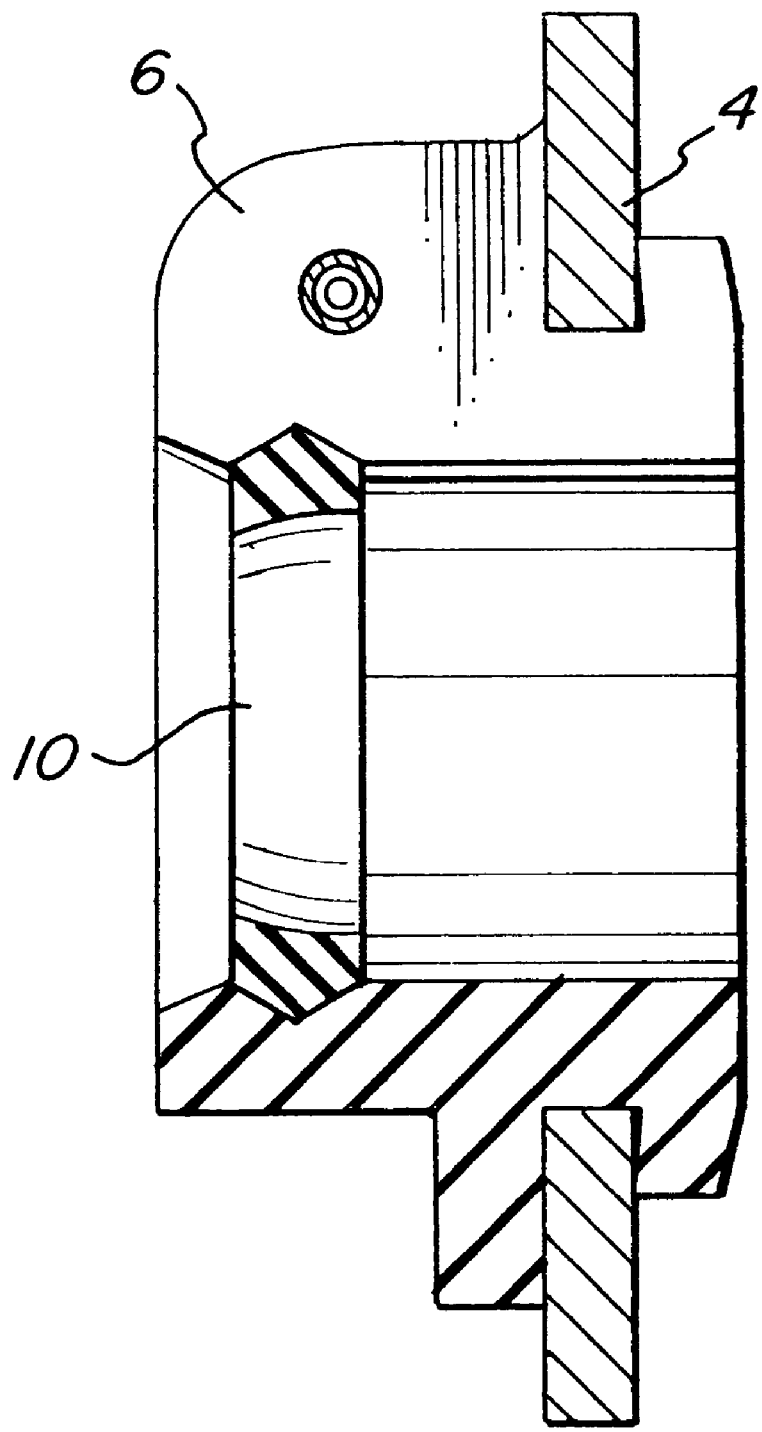
FIG. 7 is a cross-sectional view of an installed rubber sleeve without cable.

The rubber sleeve 6 has a circumferential groove 9 (FIG. 4) on its inner surface, into which a ring-shaped insert 10 made of a flexible material can be installed as illustrated in FIGS. 5 and 6. FIG. 7 illustrates the rubber sleeve 6 with the insert 10 installed therein. According to FIG. 4, the inner space of the rubber sleeve 6 widens conically toward the outside at one end. The thus created inclined runoff edge ensures that no moisture can accumulate in this area of the rubber sleeve 6.

Figure 9:
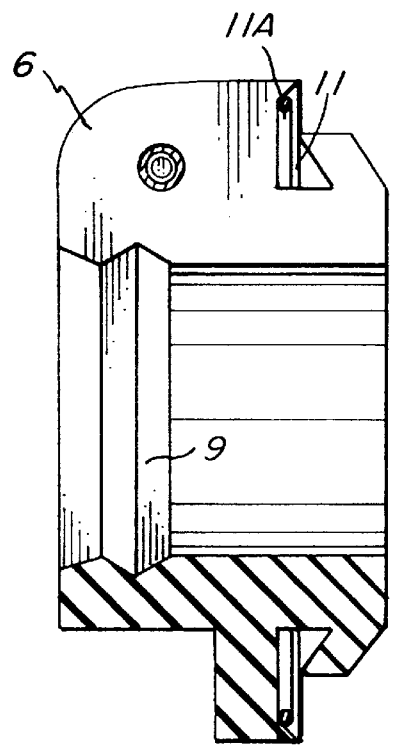
FIG. 9 is a cross-sectional view of a rubber sleeve which can be used with the device of FIG. 1 showing the placement of an additional seal element.

A circumferential recess 11 is located on the outside of the rubber sleeve 6 at the end which faces away from the conical expansion. It serves to seal the edge of plate 4 when the rubber sleeve 6 has been inserted into its hole 5. This installed position of the rubber sleeve 6 can be seen in FIG. 7. The rubber sleeve 6 seals both sides of the plate 4. To improve the seal further, an additional seal element 11A (FIG. 9), such as a butyl rubber sealant ring, can be placed into the recess 11 prior to installing the rubber sleeve 6.

The insert 10 is made of a flexible material such as a rubber material. It must be relatively easy to compress so that it can optimally perform its function as a seal. In a preferred configuration, the insert 10 has a separation 12 so that it can be placed on the cable 2 in the same manner as the rubber sleeve 6, and preferably in the same radial direction. To further improve its sealing effect, the internal diameter of the insert 10 can be symmetrically decreased toward its central axis at one axial end. This can be seen in FIGS. 6 and 7.

In a preferred configuration, the rubber sleeve 6 and the insert 10 surround a circular inner space. However, this inner space can also have a different cross section. It can be elliptical for example. This is an advantage if the cable is an elliptical electromagnetic hollow conductor.

The device of the invention is used as follows:

After the opening 3 in the wall 1 is finished, the plate 4 is mounted thereon. Subsequently, the cable 2 is pulled in far enough so that a sufficient length protrudes from the wall 1 into the building. The rubber sleeve 6 is placed on the cable 2 and is pushed in the axial direction up to the plate 4. By simultaneously turning and pushing, the end of the rubber sleeve 6 is inserted into the hole 5 of plate 4 in the position illustrated in FIG. 7. Then, the insert 10 is also placed on the cable 2 and pushed into the rubber sleeve 6 in the axial direction, until it is located in its groove 9 as illustrated in FIG. 7. Finally, the rubber sleeve 6 is closed by tightening the screw joint 8. This presses the insert 10 tightly against the cable 2.

The preferred embodiment described above admirably achieves the objects of the invention. However, it will be appreciated that departures can be made by those skilled in the art without departing from the spirit and scope of the invention which is limited only by the following claims.

What is claimed is:

1. In combination:
   (a) a wall having an opening;
   (b) a flat plate made of a stable material attached to the wall, the flat plate having an edge defining a hole that corresponds to and is aligned with the opening in the wall;
   (c) a tubular member extending through the opening in the wall and the hole in the plate; and
   (d) a device used as a seal located around the tubular member and linked to the plate, the device comprising:
      (i) a one-piece rubber sleeve containing a lengthwise separation adapted to be closed and a screw joint installed in the rubber sleeve for closing said lengthwise separation, the rubber sleeve having a circumferential groove defined on an inside surface thereof, the inside surface resting against the tubular member, the rubber sleeve having an outwardly open circumferential recess at one axial end which forms a moisture-proof seal against the edge which defines the hole in the plate; and
      (ii) a ring-shaped insert made of a flexible material in the circumferential groove of the rubber sleeve, whereby the device forms a moisture-proof seal with the device located around the tubular member and, in an installed position, linked to the plate.

2. A combination as claimed in claim 1, further including a seal element located in the circumferential recess.

3. A combination as claimed in claim 1, wherein the inner surface of the rubber sleeve is expanded conically at an end facing away from the circumferential recess.

4. A combination as claimed in claim 1, wherein an internal diameter of the insert is reduced symmetrically toward a central axis thereof at one axial end.

5. A combination as claimed in claim 4, further including a seal element located in the circumferential recess.

6. A combination as claimed in claim 5, wherein the inner surface of the rubber sleeve is expanded conically at an end facing away from the circumferential recess.

7. A device for passing a tubular member through an opening in a wall, where a flat plate made of a stable material is attached to the wall and the flat plate has an edge defining a hole that corresponds to and is aligned with the opening, the device comprising:
   (a) a one-piece rubber sleeve containing a lengthwise separation adapted to be closed, and means installed in the rubber sleeve for closing said lengthwise separation, the rubber sleeve having a circumferential groove defined on an inside surface thereof, the inside surface is designed to rest against the tubular member, the rubber sleeve having an outwardly open circumferential recess at one axial end to form a moisture-proof seal against the edge which defines the hole in the plate; and
   (b) a ring-shaped insert made of a flexible material in the circumferential groove of the rubber sleeve, whereby the device forms a moisture-proof seal when the device is located around the tubular member and, in an installed position, is linked to the plate.

8. A device as claimed in claim 7, wherein the rubber sleeve includes, as said closing means, a snap joint for closing the lengthwise separation.

9. A device as claimed in claim 8, further including a seal element located in the circumferential recess.

10. A device as claimed in claim 9, wherein the inner surface of the rubber sleeve is expanded conically at an end facing away from the circumferential recess.

11. A device for passing a tubular member through an opening in a wall, where a flat plate made of a stable material is attached to the wall and the flat plate has an edge defining a hole that corresponds to and is aligned with the opening, the device comprising:
   (a) a one-piece rubber sleeve containing a lengthwise separation adapted to be closed and a screw joint installed in the rubber sleeve for closing said lengthwise separation, the rubber sleeve having a circumferential groove defined on an inside surface thereof, the inside surface being designed to rest against the tubular member, the rubber sleeve having an outwardly open circumferential recess at one axial end to form a moisture-proof seal against the edge which defines the hole in the plate; and
   (b) a ring-shaped insert made of a flexible material in the circumferential groove of the rubber sleeve, whereby the device forms a moisture-proof seal when the device is located around the tubular member and, in an installed position, is linked to the plate.

12. A device as claimed in claim 11, further including a seal element located in the circumferential recess.

13. A device as claimed in claim 11, wherein the inner surface of the rubber sleeve is expanded conically at an end facing away from the circumferential recess.

14. A device as claimed in claim 11, wherein an internal diameter of the insert is reduced symmetrically toward a central axis thereof at one axial end.

15. A device as claimed in claim 14, further including a seal element located in the circumferential recess.

16. A device as claimed in claim 15, wherein the inner surface of the rubber sleeve is expanded conically at an end facing away from the circumferential recess.

* * * * *